United States Patent [19]

Eavenson, Sr. et al.

[11] Patent Number: 5,600,232

[45] Date of Patent: Feb. 4, 1997

[54] ALTERNATOR SYSTEM FOR A VEHICLE

[75] Inventors: Jimmy N. Eavenson, Sr., Juneau; Barry M. Hough, Beaver Dam, both of Wis.

[73] Assignee: Deere & Company, Moline, Ill.

[21] Appl. No.: 261,521

[22] Filed: Jun. 17, 1994

[51] Int. Cl.$^6$ .................................................. H02P 9/00
[52] U.S. Cl. ............................ 322/12; 322/10; 439/34
[58] Field of Search ............................... 322/12, 89, 90, 322/100; 320/15; 307/57

[56] References Cited

U.S. PATENT DOCUMENTS

| | | | |
|---|---|---|---|
| 3,793,544 | 2/1974 | Baumgartner et al. | 320/17 |
| 4,336,485 | 6/1982 | Stroud | 320/15 |
| 4,347,473 | 8/1982 | Stroud | 320/15 |
| 4,567,756 | 2/1986 | Colborn | 73/118 |
| 4,674,819 | 6/1987 | Fujitani et al. | 339/99 R |
| 4,829,228 | 5/1989 | Buetemeister | 322/27 |
| 4,832,403 | 5/1989 | Tomita | 297/330 |
| 4,842,524 | 6/1989 | Hopkins et al. | 439/35 |
| 5,245,267 | 9/1993 | Pierret et al. | 320/15 |
| 5,254,936 | 10/1993 | Leaf et al. | 322/90 |

*Primary Examiner*—Steven L. Stephan
*Assistant Examiner*—Nicholas Ponomarenko

[57] ABSTRACT

A charging system includes a high capacity charging circuit having the original internal engine alternator connected substantially in parallel with an auxiliary alternator by a simple wiring harness arrangement that easily plugs into the existing connectors for the internal engine alternator circuit so that the outputs of the alternators are cumulative. The auxiliary alternator is relatively compact, and the original engine alternator circuit remains substantially unaltered. The regulators for the two alternators include sensory inputs which are connected to each other. The alternators provide redundancy and a fail-safe backup mode so that if one of the systems fails, that system can be quickly disconnected from the remaining system without disabling the entire vehicle.

9 Claims, 1 Drawing Sheet

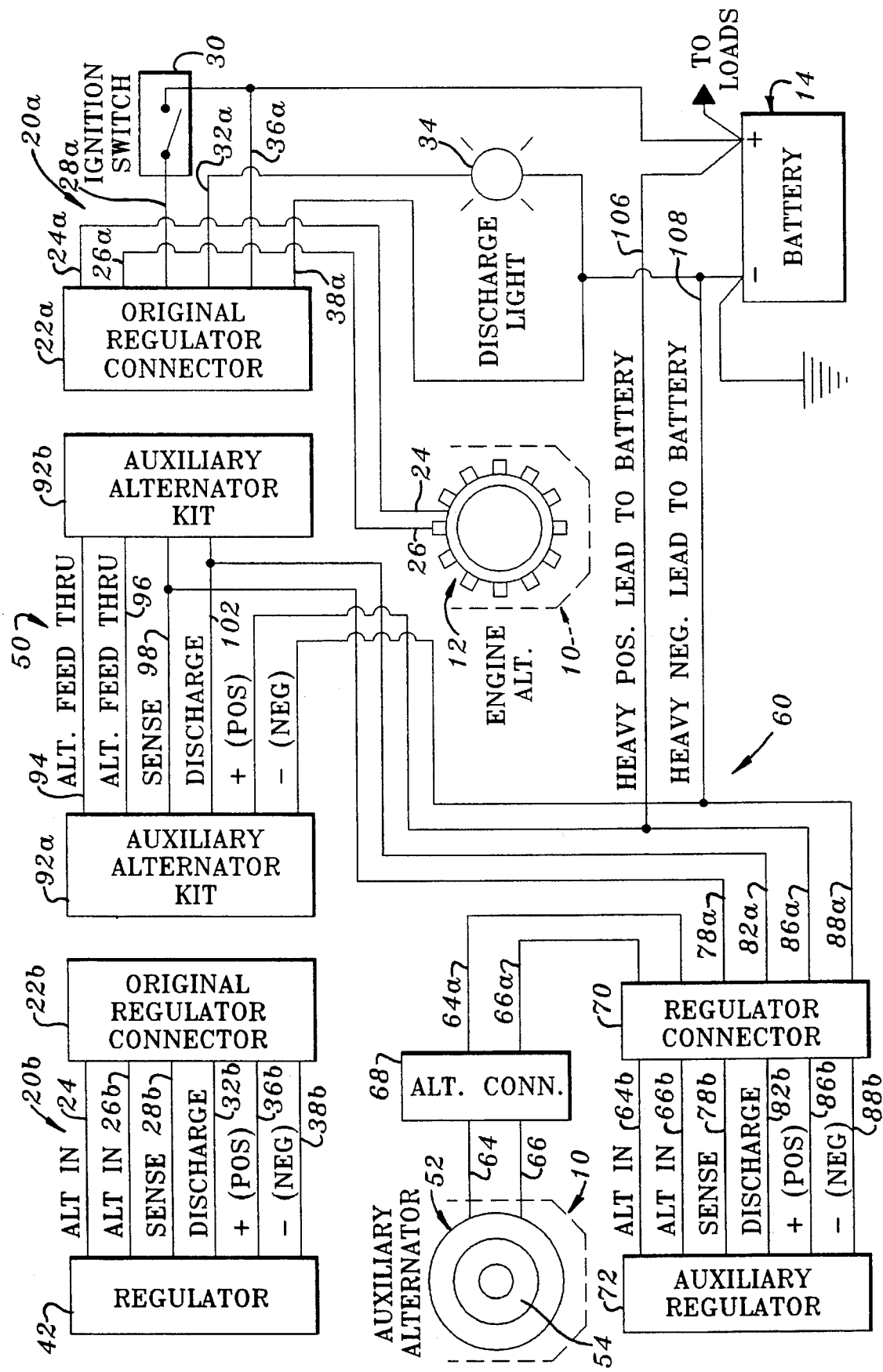

ALTERNATOR SYSTEM FOR A VEHICLE

BACKGROUND OF THE INVENTION

1) Field of the Invention

The present invention relates generally to utility vehicles, and, more specifically, to an electrical generating system for increasing the current generating capacity of such vehicles.

2) Related Art

Utility vehicle engines typically include an internal alternator which provide all the electrical power needs for the engine as well as for the accessories and attachments on the vehicle. Sometimes these accessories and attachments are operated when the engine is at or near the low idle RPM condition and consume substantially more power than can be generated by the internal alternator so that the battery is often discharged to an unacceptable level. The engine manufacturers have worked to maximize the generating capacity available in an internal alternator, but such maximum capacity has not always met the needs of many high current demand applications. Alternators are available on the market for replacing the internal alternator, but such replacement is expensive, time-consuming and requires a new, higher capacity wiring harness. Other systems include a dual system wherein a second alternator is driven by the engine and includes a circuit which is isolated from the original alternator circuit. The isolated system approach requires special wiring arrangements which make it difficult to back up one of the systems with the alternator of the other system and provide a fail-safe backup. If one of the alternators or alternator circuits fails, the corresponding system is rendered ineffective. If the failed system is in the engine circuit, the entire vehicle may be shut down.

BRIEF SUMMARY OF THE INVENTION

It is therefore an object of the present invention to provide an improved charging circuit which overcomes most or all of the abovementioned problems. It is a further object to provide such an improved circuit which is relatively simple, compact and inexpensive in construction and is easy to install.

It is a further object of the present invention to provide an improved charging circuit which does not require dual, isolated wiring systems. It is a further object to provide such a charging circuit wherein a second alternator connected to run in parallel with an existing engine alternator to provide a single circuit charging capacity which is approximately the sum of the individual alternator capacities. It is yet another object to provide such a circuit which is compact, does not require new high capacity wiring harnesses, and connects simply to the existing engine alternator circuit.

It is still another object of the present invention to provide an improved charging circuit for providing increased capacity and a fail-safe backup to reduce the probability of battery discharge or engine shut-down. It is a further object to provide such a system wherein increased capacity is achieved without need for an isolated charging system and with little or no modification of the existing engine charging system.

It is a further object to provide a charging system wherein an engine alternator and an auxiliary alternator are connected by a simple harness arrangement to provide increased generating capacity as well as a fail-safe backup. It is another object to provide such a system wherein the sensory inputs of both alternator regulators are connected. It is yet another object to provide such a system wherein the original engine alternator system is maintained and advantageously utilized in combination with the auxiliary alternator.

A charging system constructed in accordance with the teachings of the present invention includes a high capacity charging circuit having the original engine alternator connected substantially in parallel with an auxiliary alternator by a simple wiring harness arrangement that easily plugs into the existing connectors for the engine alternator circuit so that the outputs of the alternators are cumulative. The auxiliary alternator therefore can be made relatively compact, and the original engine alternator circuit remains substantially in tact. New wiring harness requirements are kept minimal, and heavy, high capacity wiring normally associated with the single high capacity single alternator circuits of many of the previously available circuits are no longer required. The regulators for the two alternators include sensory inputs which are connected to each other. The alternators provide redundancy and a fail-safe backup mode not available with most of the previously available high capacity arrangements. If one of the systems fails, that system can be quickly disconnected from the remaining system without disabling the entire vehicle.

These and other objects, features and advantages of the present invention will become apparent to one skilled in the art upon reading the following detailed description in view of the drawings.

BRIEF DESCRIPTION OF THE DRAWINGS

The single drawing FIGURE shows a schematic of the charging circuit of the present invention.

DETAILED DESCRIPTION OF THE DRAWINGS

Referring now to the drawing FIGURE, therein is shown a portion of a utility vehicle engine 10 which includes conventional engine alternator 12 mounted in the engine and supplying power to a battery 14 through standard wiring harness sections 20a, 20b. The section 20a in a conventional single alternator charging circuit includes a 6-pin connector section 22a which is plugged into a mating 6-pin connector section 22b of the harness section 20b. The section 20a includes two leads 24a and 26a connected to terminals 24 and 26 of the alternator 12, a switch lead 28a connected to the output terminal of an ignition switch 30, and a discharge indicator line 32a connected to one terminal of a discharge indicator 34. The input to the ignition switch 30 is connected to the positive terminal of the battery 14 and the second terminal of the indicator 34 is connected to the negative terminal of the battery. Lines 36a and 38a of the harness section 20a are also connected respectively to the positive and negative terminals of the battery 14.

The harness section 20b includes lines 26b, 28b, 32b, and 38b leading to the input terminals of an original alternator regulator 42. Lines 24b and 26b are input lines leading from the alternator 12, line 28b is a voltage sensing line for monitoring the voltage at the battery 14, line 32b is a discharge indicator line, and the lines 36b and 38b are the positive and negative regulator output lines leading from the regulator 42 to the battery. When only a single alternator (engine alternator 12) is sufficient for the electrical loads typically encountered for the engine 10 and the accessories and attachments used with the vehicle, the connector section 22a of harness section 20a is plugged into the connector section 22b of harness section 20b so that the lines 24a–38a are connected directly to the lines 24b –38b, respectively.

The engine alternator 12 provides charging current via lines 36a, 36b and 38a, 38b up to a maximum charging current, which for a typical utility vehicle is on the order of 10 to 20 amps.

An auxiliary alternator circuit indicated generally at 50 is provided for applications where charging capacity is needed beyond that available from the engine alternator 12, for example, when accessories or attachments are used with the vehicle that can consume up to 25 amps or more individually. As shown, the circuit 50 in combination with the original charging circuit provides adequate charging capacity for accommodating a substantial current load, even at low engine idle.

The auxiliary circuit 50 includes an auxiliary alternator 52 which is mounted on the engine 10 and preferably includes a pulley 54 which is belt-driven from a drive sheave (not shown) on the engine. An auxiliary alternator wiring harness, indicated generally at 60, includes a pair of alternator leads 64a and 66a which connect to alternator terminals 64 and 66 via connector 68. A connector 70 joins the leads 64a and 66a to input lines 64b and 66b of an auxiliary regulator 72, which is generally of the same type as the regulator 42. A voltage sensing line 78b, a discharge indicating line 82b, and positive and negative terminal lines 86b and 88b also extend between the auxiliary regulator 72 and the connector 70.

The auxiliary wiring harness 60 also includes lines 78a, 82a, 86a and 88a joined to the corresponding regulator lines 78b, 82b, 86b and 88b, respectively, by the connector 70. The lines 78a–88a are also connected to a pair of connector sections 92a and 92b which mate with the connector sections 22b and 22a, respectively, when the sections 22a and 22b are unplugged from each other. Alternator feed through lines 94 and 96 extend between the sections 92b and 92a, and connect the original lines 24a and 26a of the harness section 20a to the original alternator lines 24b and 26b of the harness section 20b when the circuit 50 is inserted into the system. A sense line 98 similarly connects the line 28a with the line sense line 28b. In addition, the line 98 is connected to the line 78a leading to the sensory input line 78b of the auxiliary regulator so that, when the circuit 50 is connected, the sense lines 28b and 78b of the regulators 42 and 72 are connected and sense the same voltage. A discharge indicator connecting line 102 provides a connection between the lines 32a and 32b and is also connected to the discharge indicating line 82b.

The positive and negative auxiliary regulator output lines 86b and 88b and the corresponding lines 86a and 88a on the output side of the connector 70 are connected to the section 92a so that when the section 92a is plugged into the section 22b, the output lines from both regulators 42 and 72 will be connected together to provide generally parallel operation of the two alternator systems. As seen in the drawing figure, no connections are made between the connector sections 92a and 92b corresponding to the lines 36a, 38a and 36b, 38b. Rather, a pair of heavier positive and negative leads 106 and 108 connected to the leads 86a and 88a, respectively, provide a high capacity current path from the regulator outputs to the positive and negative terminals of the battery 14 to handle the total capacity of the alternators 12 and 52 which is substantially the sum of the capacities of the individual alternators. If desired, the original leads 36a and 38a can be of a higher capacity and connecting leads can be provided between the connector sections 92a and 92b to eliminate the additional leads 106 and 108. However, providing the leads 106 and 108 eliminates the need for any one connector to carry the cumulative current output of the two alternators and provides a more reliable circuit.

In operation, assuming initially that the vehicle is equipped only with the original engine alternator 12, the circuit 50 is absent and the connector section 22a is plugged directly into the connector section 22b for conventional charging operation. If for any reason it is desirable to increase the charging capacity of the system, the auxiliary alternator 52 is connected by a conventional mounting (not shown) to the engine 10. The additional regulator 72 is connected to the vehicle and the wiring harness 60 is installed by plugging in the connectors 68 and 70. The connector sections 22a and 22b are separated, the connector section 92a is plugged into the connector section 22b, and the connector section 22a is plugged into the connector section 92b. The leads 106 and 108 are connected to the positive and negative terminals of the battery 14. The system permits the original alternator circuit including the original wiring harness 20a, 20b to be utilized, with the auxiliary alternator circuit providing additional capacity when necessary. The above-described connecting arrangement provides easy installation, redundancy in case one of the alternator systems fails, and easy isolation of the systems if necessary for trouble-shooting or to maintain the vehicle operational when one of the systems does fail.

Having described the preferred embodiment, it will become apparent that various modifications can be made without departing from the scope of the invention as defined in the accompanying claims.

We claim:

1. In a charging system for a utility vehicle presenting a peak current load of at least a preselected demand level, the vehicle including a battery, an engine having an internal alternator system with an internal alternator having an output capacity less than the preselected demand, the internal alternator system including an internal alternator regulator, and a wiring harness having at least one separable connector with mating first and second connector portions, the wiring harness connecting the internal alternator with the battery and internal alternator regulator to provide regulated power to the battery, an auxiliary alternator system selectively connectible to the internal alternator system including:

an auxiliary alternator driven by the engine and having an output; and an auxiliary wiring harness connected to the auxiliary alternator and including third and fourth connector portions conforming generally to the second and first connector portions, wherein the third and fourth connector portions mate with the first and second connector portions, when the separable connector is separated, to connect the auxiliary alternator output to the first wiring harness to thereby supplement the output capacity of the internal alternator system and facilitate connection/disconnection of the auxiliary alternator independently of additional switches.

2. The invention as set forth in claim 1 wherein the auxiliary alternator and the internal alternator are connected substantially in parallel when the third and fourth connector portions are mated with the first and second connector portions.

3. The invention as set forth in claim 1 further including an auxiliary alternator regulator, and wherein the auxiliary alternator regulator and the internal alternator regulator include sensory inputs and regulated outputs, and the auxiliary wiring harness includes a conductor connecting the sensory inputs.

4. The invention as set forth in claim 3 wherein the auxiliary wiring harness includes a pair of leads connecting the regulated outputs of the regulators, and wherein the first and second connector portions when mated together provide a closed path from the internal alternator through the separable connector to the battery, the auxiliary wiring harness opening the path from the internal alternator through the separable connector when the third and fourth connector portions mate with the first and second connector portions to thereby limit current flow through the separable connector when the auxiliary alternator output is connected.

5. The invention as set forth in claim 4 wherein the auxiliary wiring harness includes a common regulatory input lead connected to the regulators.

6. The invention as set forth in claim 1 wherein the auxiliary wiring harness further includes high capacity positive and negative leads connected to the third and fourth connector portions and to the battery, the leads providing a current path to the battery from both the alternators and limiting current flow through the first and second connector portions to less than a sum of current flow from the alternators when the first and second connector portions are mated with the third and fourth connector portions.

7. In a charging system for a utility vehicle presenting a peak current load of at least a preselected demand level, the vehicle including a single battery, an engine having an internal alternator system having an output capacity less than the preselected demand level, the internal alternator system including an internal alternator, a regulator, and a first wiring harness connecting the internal alternator with the single battery and internal alternator regulator to provide regulated power to the battery, the first wiring harness including a power lead extending from the regulator to the battery, an auxiliary alternator system including:

an auxiliary alternator connected to the engine and driven by the engine, the auxiliary alternator having an output; and an auxiliary wiring harness extending between the auxiliary alternator output and the single battery and connecting the auxiliary alternator substantially in parallel with the internal alternator to thereby supplement the output capacity of the internal alternator system, the cumulative outputs of the alternators generally being equal to or greater than the preselected demand level; and wherein the first wiring harness includes a separable connector having first and second mating connecting portions, and wherein the auxiliary wiring harness includes harness connecting structure with third and fourth connecting portions for mating with the first and second mating connecting portions, respectively, when the first and second mating connecting portions are separated, to connect the internal and auxiliary alternators in parallel and directly to the single battery.

8. The invention as set forth in claim 7 further comprising an auxiliary regulator connected to the auxiliary alternator, the regulators having sensing inputs, the sensing inputs connected to each other and to the battery.

9. In a charging system for a utility vehicle presenting a peak current load of at least a preselected demand level, the vehicle including a battery, an engine having an internal alternator system having an output capacity less than the preselected demand level, the internal alternator system including an internal alternator, a regulator, and a first wiring harness connecting the internal alternator with the battery and internal alternator regulator to provide regulated power to the battery, the first wiring harness including a power lead extending from the regulator to the battery, an auxiliary alternator system including:

an auxiliary alternator connected to the engine and driven by the engine, the auxiliary alternator having an output;

an auxiliary wiring harness extending between the auxiliary alternator output and the battery and connecting the auxiliary alternator substantially in parallel with the internal alternator to thereby supplement the output capacity of the internal alternator system, the cumulative outputs of the alternators generally being equal to or greater than the preselected demand level;

wherein the first wiring harness includes a separable connector having first and second mating connecting portions, and wherein the auxiliary wiring harness includes harness connecting structure for mating with the first and second mating connecting portions, when the first and second mating connecting portions are separated, to connect the internal and auxiliary alternators in parallel; and wherein the auxiliary wiring harness includes positive and negative leads connecting the outputs of the alternators to the battery, and wherein the harness connecting structure includes means for for limiting current flow through the power lead to the battery when the connecting structure is mated with the first and second mating connecting portions so that the cumulative output of the alternators is not carried by any one of the connecting portions.

* * * * *